United States Patent [19]
Hebert

[11] Patent Number: 5,596,454
[45] Date of Patent: Jan. 21, 1997

[54] UNEVEN SURFACE IMAGE TRANSFER APPARATUS

[75] Inventor: Ray Hebert, Los Gatos, Calif.

[73] Assignee: The National Registry, Inc., St. Petersburg, Fla.

[21] Appl. No.: 332,548

[22] Filed: Oct. 28, 1994

[51] Int. Cl.⁶ .................................................. G02B 17/00
[52] U.S. Cl. ...................... 359/726; 250/227.11; 356/71; 382/124; 382/126; 382/127; 359/728
[58] Field of Search ..................... 382/124, 126, 382/127; 385/33, 146; 356/71; 250/227.11; 359/726, 727, 728, 729, 730, 731

[56] References Cited

U.S. PATENT DOCUMENTS

| 3,865,488 | 2/1975 | Del Rio | 356/71 |
|---|---|---|---|
| 3,975,711 | 8/1976 | McMahon | 356/71 |
| 4,120,585 | 10/1978 | DePalma et al. | 356/71 |
| 4,455,083 | 6/1984 | Elmes | 356/71 |
| 4,684,802 | 8/1987 | Hakenewerth et al. | 250/235 |
| 4,728,186 | 3/1988 | Eguchi et al. | 356/71 |
| 4,783,167 | 11/1988 | Schiller et al. | 356/71 |
| 4,784,484 | 11/1988 | Jensen | 356/71 |
| 4,785,171 | 11/1988 | Dowling, Jr. et al. | 356/71 |
| 4,924,085 | 5/1990 | Kato et al. | 250/227.28 |
| 5,067,162 | 11/1991 | Driscoll, Jr. et al. | 382/5 |
| 5,088,321 | 2/1992 | Kajikawa et al. | 73/146 |
| 5,088,817 | 2/1992 | Igaki et al. | 356/71 |
| 5,109,428 | 4/1992 | Igaki et al. | 382/5 |
| 5,146,102 | 9/1992 | Higuchi et al. | 382/127 |
| 5,177,802 | 1/1993 | Fujimoto et al. | 382/4 |
| 5,187,748 | 2/1993 | Lee | 382/4 |
| 5,241,606 | 8/1993 | Horie | 356/71 |

Primary Examiner—Georgia Y. Epps
Assistant Examiner—Michael A. Papalas
Attorney, Agent, or Firm—Darby & Darby, P.C.

[57] ABSTRACT

Enhanced performance of an uneven surface image transfer apparatus is provided by using a well-defined convergent field of illumination that is nominally focussed at the stop of an imaging lens. An integrated optical system exhibiting such enhanced performance includes an aspheric illuminating lens that directs radiant energy onto a presentation platen from which fingerprint or bar code images are transferred to an external image sensing device, such as a charged coupled device chip. An evanescent wave image is totally internally reflected (TIR) off of the platen along an optical path including a plurality of TIR surfaces to achieve a predetermined optical path length. One or more of the TIR surfaces may be curved to reduce or eliminate astigmatism and geometric distortion. An aspheric imaging lens having a split-axis aperture stop transfers the image rays to the image sensing device. The split axis aperture stop has its stop axes on opposite sides of the nominal focal point of the aspheric illuminating lens. The image transfer apparatus has utility with surfaces that are uneven in the sense that there is coded image data in the form of spatial or intensity contrasts, such as bar codes.

31 Claims, 6 Drawing Sheets

FIG. 7
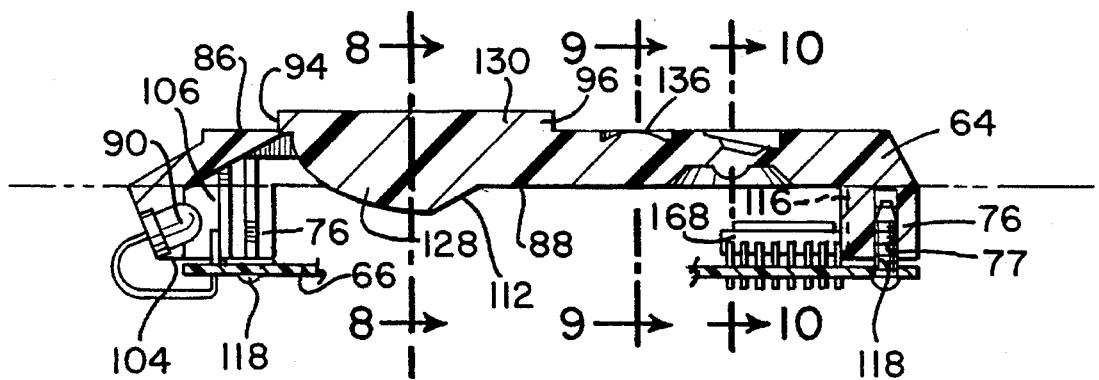
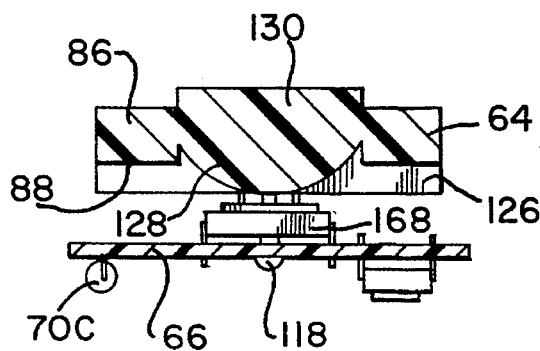
FIG. 8
FIG. 9
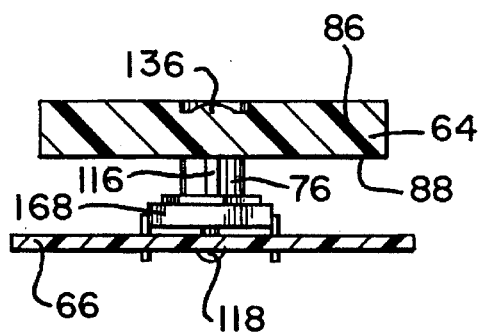
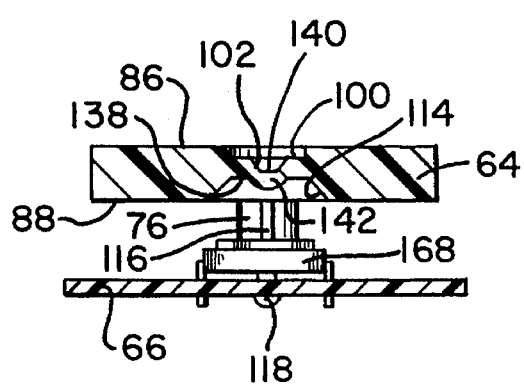
FIG. 10

UNEVEN SURFACE IMAGE TRANSFER APPARATUS

FIELD OF THE INVENTION

The present invention relates to an uneven surface image transfer apparatus, and more particularly to an apparatus for transferring the image, for example, of a fingerprint, from a finger platen to an image detection device while preserving geometric fidelity.

BACKGROUND OF THE INVENTION

According to one conventional method of acquiring fingerprint data, an ink impression of a fingerprint is printed on paper for subsequent scanning into a digital computer. According to this method, the finger is stained with ink each time the fingerprint data is entered. Any uneven coating or blurring of the ink hinders the input operation, as does any lateral motion or shear of the inked finger when applied to the paper. To ensure that enough information is obtained during data input or enrollment, the finger is typically "rolled" across the paper to transfer a greater portion of the surface of the person's finger thereto. While the rolling step increases the overall amount of data acquired, the increased risk of finger shear undermines the integrity of the acquired data. Further, geometric or electronic distortion may be introduced during the process of scanning the data into the digital computer.

According to more modern methods, fingerprints are obtained by reflecting or scattering an image of the finger surface onto an image sensor, such as a charge coupled device. Devices that perform this function are described in, for example, U.S. Pat. No. 4,924,085 to Kato et al., U.S. Pat. No. 5,088,817 to Igaki et al., and U.S. Pat. No. 5,067,162 to Driscoll, Jr., et al., the disclosures of which are hereby incorporated by reference as though set forth in their entirety herein. In each of these systems, a light source is irradiated at an angle onto the ridge and groove portions of a fingerprint which has been pressed against a light conducting plate. Depending upon the particular orientation of the light source with respect to the light conducting plate, and the location of the image sensing device, either the reflected or the scattered light from the fingerprint is transferred. The image sensor captures the transferred light so that the captured fingerprint data can be stored. These fingerprint readers have comprised relatively large optical systems having numerous optical components or, in an attempt to simplify the optical system, for example, as in the U.S. Pat. No. 4,924,085, have sacrificed resolution and geometric fidelity.

What has been needed and has heretofore not been fulfilled in the art, is an uneven surface image transfer system that provides an unadulterated signal of high resolution at an image sensing device that is remote of the image transfer platen in a low cost system. Also needed is an apparatus that provides an uneven surface image transfer system with the aforementioned advantages, in a unitary structure. Of further benefit to the art, would be such a system that further allows the transfer of images such as bar code data. The present invention satisfies these and other needs in an uneven surface image transfer apparatus.

SUMMARY OF THE INVENTION

The invention provides an uneven surface image transfer apparatus having enhanced performance characteristics by a well-defined convergent field of illumination using an aspheric illuminating lens, the illuminating lens transferring light from an external radiation source to a platen at or above a critical angle to create total internal reflection (TIR) within an optical plate. A finger or other object is placed on the platen to selectively decouple an evanescent wave image formed at the platen and for conveyance to an off-axis imaging lens by TIR reflections within the optical plate. The radiation source is nominally focussed by the illuminating lens at the stop of the imaging lens. The evanescent wave image is totally internally reflected off of the platen and along an optical path including a plurality of TIR surfaces as image rays to achieve a predetermined optical path length. The imaging lens is aspheric and has a split-axis aperture stop which is adjusted by one or more of the TIR surfaces, or absence thereof. The imaging lens transfers the image rays to the image sensing device. The split axis aperture stop has its stop axes on opposite sides of the nominal focal point of the aspheric illuminating lens to accommodate astigmatism. The image transfer apparatus has utility with surfaces that are uneven in the sense that there is coded image data in the form of spatial or intensity contrasts, such as bar codes.

The aspheric illuminating lens, aspheric imaging lens, and each of the TIR surfaces therebetween, including the platen, may be formed integral to the optical plate.

The invention provides an optical plate for transferring such images from the platen to the external image sensing device. To reduce geometric distortion and astigmatism at the image sensing device, a pair of toroidal reflective surfaces are used in conjunction with the off-axis aspheric imaging lens. In conjunction with the off-axis nature of the design, this creates astigmatism within the optical path in the vicinity of the stop plane of the imaging lens, which must be controlled for resolution. This may be accomplished by providing reflective surfaces with particular geometries, coatings, or both to reduce or eliminate astigmatism and geometric distortion. For example, the toroidal surfaces of the disclosed embodiments are provided with optical power that is dominant in the axis of propagation. However, this creates astigmatism within the optical plate, especially at the nominal stop plane of the off-axis aspheric imaging lens, which then has differential stop planes in the x- and y-axes. In addition to these toroidal surfaces, additional reflective surfaces may be provided to increase the optical path length sufficient to provide a preselected image magnification, to direct the light within the optical plate toward the aspheric imaging lens, or for both reasons.

In a second embodiment, the invention provides an optical plate for transferring bar code or other high-contrast data from the vicinity of from a platen to an external image sensing device. In this embodiment, the "uneven surface" is uneven in the optical sense insofar as the surface may contain contrasting spatial or intensity surfaces, and in particular, juxtaposed black and white images such as found in a bar code label such as a UPC label.

As a modification to these embodiments to enhance resolution, the radiation source or image sensing means can be either shuttered, strobed, or both, in order to reduce the exposure time of the image sensing device to image data from the platen.

These and other features of the invention are described in detail in the following description of presently preferred illustrative embodiments.

BRIEF DESCRIPTION OF THE DRAWINGS

FIG. 7 is a cross-sectional view taken along the line 7—7 of FIG. 5;

FIG. 8 is a cross-sectional view taken along the line 8—8 of FIG. 7;

FIG. 9 is a cross-sectional view taken along the line 9—9 of FIG. 7;

FIG. 10 is a cross-sectional view taken along the line 10—10 of FIG. 7;

DETAILED DESCRIPTION OF THE PREFERRED EMBODIMENTS

Figure 1:
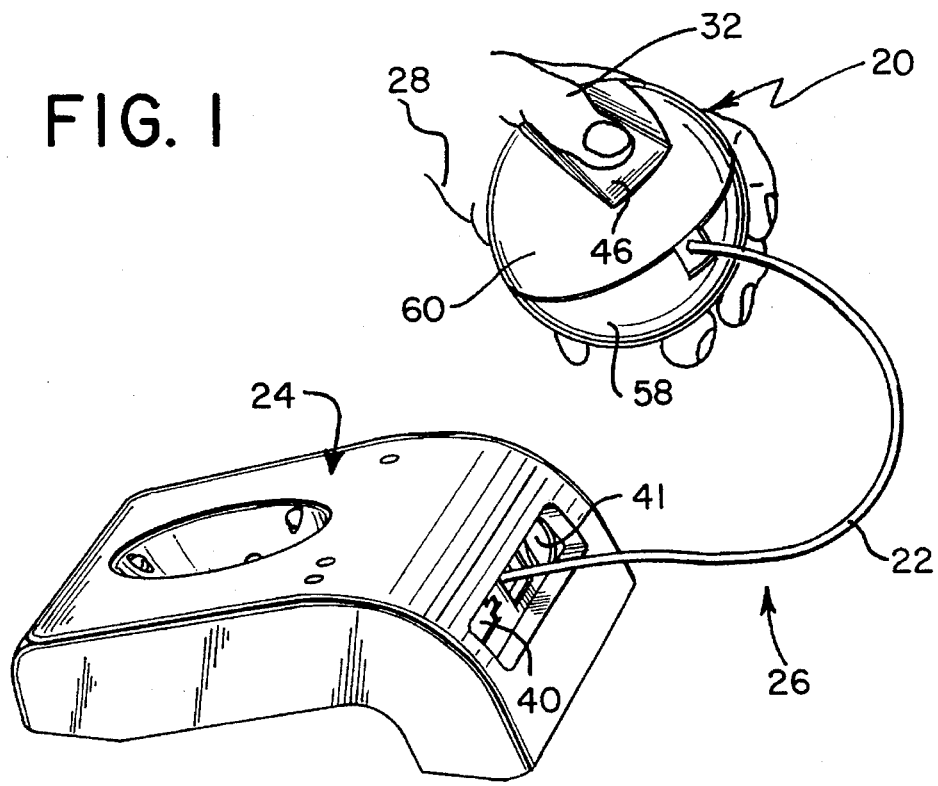
FIG. 1 shows a perspective view of a fingerprint reader apparatus as may be used with the uneven surface image transfer apparatus of a first embodiment of the present invention.

By way of overview and introduction, there is seen in FIG. 1, a fingerprint reader apparatus 20 as may be used with the uneven surface image transfer apparatus of the present invention. The illustrated fingerprint reader apparatus 20 has particular advantages that are attributable to the ergonomic shape of the unit, as described in co-pending U.S. Application Serial No. UNASSIGNED to Merjanian, for ERGONOMIC FINGERPRINT READER APPARATUS, filed on Oct. 28, 1994, the disclosure of which is hereby incorporated by reference as though fully set forth herein. However, the particular housing for the image transfer apparatus of the present invention is not critical to the present invention.

Briefly, the ergonomic apparatus 20 may be connected by a tether 22 to a base unit 24 to comprise a fingerprint reading system 26. In FIG. 1, a hand 28 has grasped the ergonomic reader 20 and has placed a digit 32 on a platen 130 (obscured in this Figure by the digit 32). The platen is one reflective surface of an optical plate 64 that comprises the uneven surface image transfer apparatus of the present invention. The platen serves as an image transfer surface upon which the image from the digit 32 is conveyed to an image sensing device. The image sensing device converts the optical image from a top or presentation surface 31 of the platen 130 to an electronic signal for transmission through wires or optical cables (not shown) within the tether 22 to the base 24. Further, information may be transferred from the base 24 to an external device, for example, a computer or modem, through a serial interface 40. A power port 41 may be used to connect the system to an external source of power, if necessary.

The print of every digit 32 is comprised of raised ridges separated by sunken valleys. The patterns of the print are unique to every individual. When the digit 32 is placed on the presentation surface 31 of the platen 130, the ridges of the fingerprint will decouple near-surface electromagnetic fields at their contact points, thereby causing an evanescent wave surface effect to occur at the platen, that is, causing the rays at those points to be absorbed, scattered, or both. This severely attenuates the rays at those contact points and produces a wavefront of attenuated evanescent wave image rays (or an absence of evanescent wave image rays) for transfer to the image sensing device 168. Meanwhile, because the valleys between the ridges do not contact the platen, the evanescent wave image rays at those points remain unaffected and TIR occurs. As a result, a negative image of the print is obtained at an external image sensing device 168, as shown in FIG. 2.

Figure 2:
FIG. 2 is a negative image of a fingerprint that has been transferred to an image sensing device by the uneven surface image transfer apparatus of the present invention.

In FIG. 2, the dark portions of the fingerprint image represent the contact points of the ridges of the fingerprint of the individual's digit 32 with the presentation surface 31 of the platen 130. These contact points cause an evanescent wave surface effect to occur at the platen 130, and produce a wavefront of severely attenuated image rays for transfer to the image sensing device 168. The lighter portions represent the locations of the valleys of the individual's digit at which points the evanescent wave has not been decoupled because no surface effect has occurred at the platen 130, and so any radiation injected into the optical plate 64 is transferred to the image sensing device 168 at these points without interference. As a result of veiling glare, that is, internal scattering that ultimately impinges on the image sensing device, the contrast between the dark and light portions may be reduced somewhat; however, this mild reduction in contrast is tolerable by most image processing systems.

Figure 3:
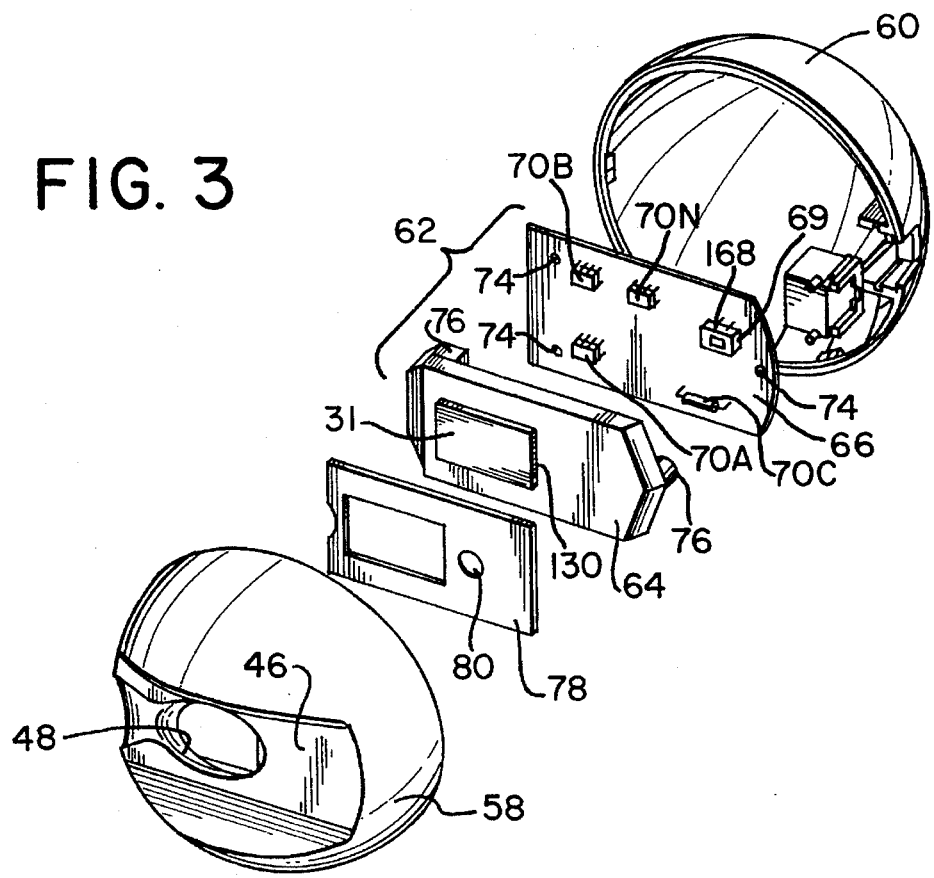
FIG. 3 is an exploded view of the apparatus of FIG. 1 detailing the relative arrangement of the uneven surface image transfer apparatus of the present invention with other components.

With reference now to FIG. 3, there is seen an exploded view of the apparatus of FIG. 1 detailing the relative arrangement of the uneven surface image transfer apparatus of the present invention with other, non-critical components. The ergonomic reader 20 has first and second hemispherical portions 58,60 that house an integrated optical system 62. In accordance with another aspect of the present invention, the integrated optical system 62 comprises in addition to the optical plate 64 having a platen 130 on one side thereof, a printed circuit board (PCB) 66 on the other side thereof, although other configurations are of course possible. The PCB 66 includes the external image sensing device 168 upon which images from the platen 130 are conveyed and a complement of other electronic components 70A,B, . . . N.

The first hemispherical portion 58 has a generally planar surface 46 with an aperture 48 therethrough. The aperture 48 is assembled in register with the platen 130 of the optical plate 64 to provide a window to the platen so that fingerprint data may be acquired by placing the digit 32 on the presentation surface 31 of the platen 130, as illustrated in FIG. 1. While the aperture 48 is illustrated as having a generally elliptical opening, the invention is not so limited. As previously noted, the housing for the uneven surface image transfer apparatus is not critical to the invention. Throughholes 74 in the PCB 66 and posts 76, extending from one side of the optical plate 64, permit assembly of the integrated optical system 62 as a unit. Preferably, the posts 76 have threaded apertures 77 (FIG. 7) to receive screws 77A to complete the assembly.

A piece of structural foam adhesive tape 78 is interposed between the assembly of the integrated optical system 62 and the first hemispherical portion 58 to seal the assembly into contact with the first hemispherical portion. The tape 78 also serves as a gasket to block light, seal out dirt and grease, and otherwise isolate the reflective surfaces of the optical plate 64 from contact with the first hemispherical portion or other objects along the optical path that the evanescent wave image is conveyed. Isolation along the optical path is required as any contact with a reflective surface in the path will decouple portions of the evanescent wave image by absorbing light and causing scatter instead of reflection. For example, at least one aperture 80 is provided in the tape 78 to isolate reflective surfaces of a top surface 86 of the optical plate 64 along the optical path of the transferred image. Similarly, an apertured surface may be placed in contact with a bottom surface 88, provided that the interface of the optical plate 64 with some other object is free of contact with the other object at points of total internal reflection (TIR) along the optical path. The aperture 48 in the first hemispherical portion allows contact of the digit 32 with the presentation surface 31 to decouple the field in the vicinity of the ridges of the fingerprint, but not in the vicinity of the valleys, to prevent specular reflection at such contact points and remove radiation thereat. As a result, a negative image of the digit 32 on the presentation surface 31 is created and transferred to the external image sensing device 168, as shown in FIG. 2.

The second hemispherical portion 60 is snap-fit into contact with the first hemispherical portion 58 to complete the assembly. Other electronics, for example, circuitry related to fingerprint data compression, analysis, or both, or related to other electronic functions such as wireless communication, etc. may be housed within the second hemispherical portion 60.

Figure 4:
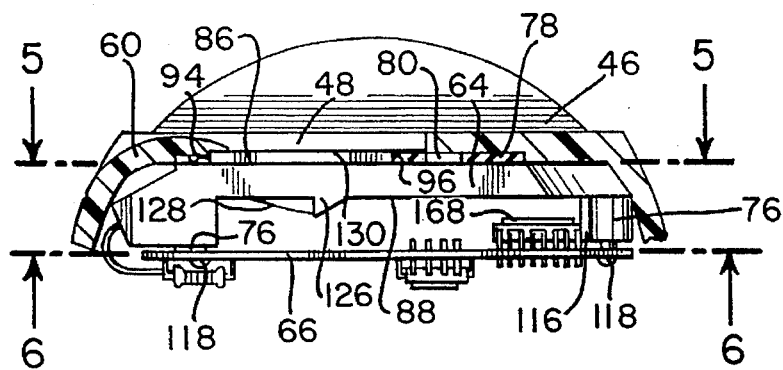
FIG. 4 is a partial cross-sectional view of the apparatus of FIG. 1 illustrating the assembled arrangement of the uneven surface image transfer apparatus of the present invention with other components.

FIG. 4 depicts the physical relationship among the assembled components, and in particular, the assembly of the integrated optical system 62 of FIG. 3. As illustrated, the printed circuit board 66 and optical plate 64 assembly are secured in position by the tape 78 immediately below the planar surface 46. In addition, the platen 130 is shown aligned with the aperture 48 so that a digit 32 placed on the presentation surface 31 of the platen 130 can provide input data to the image sensing device 168 mounted on the printed circuit board 66.

The optical plate 64 precisely converges a field of radiation from an external source 90 using an aspherical illuminating lens 128. In the preferred embodiment, the illuminating lens 128 is an aspherical lens that nominally focusses the radiation from the source 90 at point between two totally internally reflecting (TIR) surfaces within the optical plate 64. The source 90 is mounted within a slot 92 on the bottom surface 88 of the optical plate 64 such that its center line of radiation is in common with the center line of the illuminating lens 128 (see FIG. 6). Preferably, the source 90 has the form factor of a T-1 package, and preferably is a T-1 package light emitting diode (LED). In this manner, the aspherical illuminating lens 128 uniformly irradiates leading and trailing edges 94, 96 of the platen 130 by bending the light from the source 90 while efficiently coupling the radiation therefrom into the optical plate 64. In accordance with an aspect of the invention, the aspherical illuminating lens 128 mildly converges the radiation from the source 90 into a cone that is nominally focussed at the aperture stop of an imaging lens 142, so that most of the light from the source 90 transfers to the image sensing device 168 as a wavefront of evanescent wave image rays.

The light from the source 90 is conveyed by the illumination lens 128 to the platen 130 at angles in excess of the critical angle according to Fresnel's laws of reflection. As a result, the radiation that is incident on the platen 130 will then totally internally reflect (TIR) therefrom at each glass-to-air or plastic-to-air interface along the optical path and thereby propagate or transfer through the optical plate 64 to the imaging lens 142. By transferring the evanescent wave image within the optical plate 64 at angles in excess of the critical angle, the resultant optical path is longer than the physical length of the optical plate 64. The critical angle is approximately forty-two degrees for acrylic plastic; however, TIR can be achieved at angles less than the critical angle by coating the surface with a reflective material such as aluminum or silver, for example.

At each surface of the optical plate 64 between the illuminating lens 128 and the imaging lens 142 along the optical path, the evanescent wave image rays reflect at an angle equal to angle of incidence in accordance with Snell's Law, and is directed, according to the present invention, by changing the orientation or curvature of the reflecting surface. The evanescent wave image rays continue to reflect within the optical plate 64 until it is directed to the imaging lens 142, at which point it exits the optical plate 64 and is presented to the surface of the external image sensing device 168.

To better ensure that the platen is uniformly irradiated, a diffusing or apodizing surface 98 may be interposed between the source 90 and the illuminating lens 128.

Because TIR requires an angle of incidence of the radiation source 90 to the planar presentation surface 31 that is typically in excess of forty-two degrees, the image rays transferred to the external image sensing device 168 would normally experience a high degree of geometric perspective distortion. For example, when a rectangular platen is imaged to the external imaging device 168, it appears in a keystone or trapezoidal shape because the sides are imaged to be non-parallel. This is because each of the optical surfaces are used off-axis, that is, light is not nominally incident in a direction normal to their surfaces, but rather strikes a leading edge of the surface before the trailing edge. Such distortion can be corrected by a compensating tilt in the image plane as taught in the aforementioned U.S. Pat. No. 4,924,085, but the acquired image suffers significant loss of resolution as the imaging lens cannot maintain a well-defined focus over the entire tilted plane. While such distortion can be partially corrected after acquiring the image by electronic signal processing, the resolution of the acquired image remains compromised insofar as the full field of the image acquisition device has not been utilized. In accordance with the invention, however, one or more toroidal TIR elements are placed intermediate to the presentation surface 31 and the imaging lens 142 to reduce or eliminate geometric perspective distortion and astigmatism prior to transferring the image rays to the external image sensing device 168. The toroidal elements in conjunction with the off-axis imaging asphere influence the light path in a manner to make the image at the image sensing device 168 appear as though the source 90 irradiated the platen 130 in a nearly orthogonal direction, rather than at the critical angle that was actually used to introduce TIR. Further, the use of aspheric lenses 128 and 142 in place of simple spherical surfaces further contributes to the high-resolution, low distortion images that are transferred by the optical plate 64 to the external image sensing device 168.

With reference to FIGS. 5–10, the features of an optical plate 64 of a preferred embodiment are described. Each of the described surfaces is positioned along the optical axis of the optical plate 64 so that reflected light from the leading and trailing edges 94, 96 of the platen 130 are incident upon each of the respective surfaces and transferred toward the external image sensing device 168 by TIR.

Figure 5:
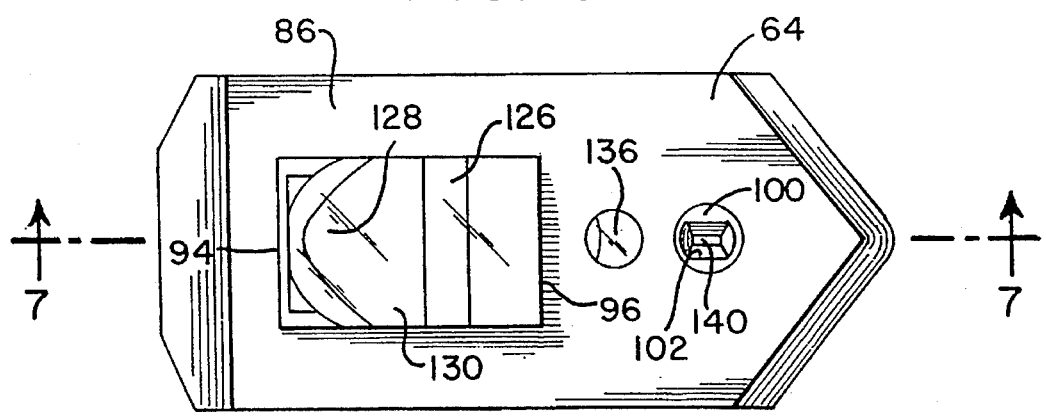
FIG. 5 is a top view of only the image transfer apparatus, taken along the line 5—5 of FIG. 4.
Figure 6:
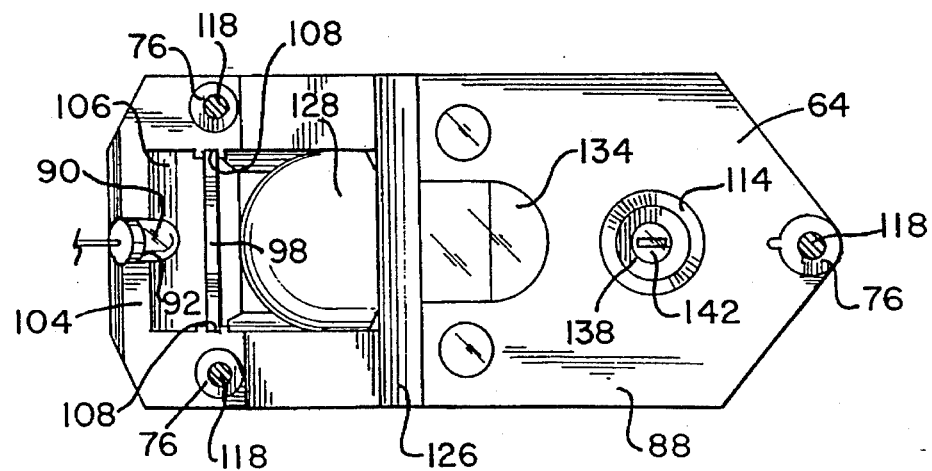
FIG. 6 is a bottom view of only the image transfer apparatus, taken along the line 6—6 of FIG. 4.

In FIGS. 5 and 6 top and bottom views of the optical plate 64 are respectively illustrated. The optical plate 64 may comprise a clear, solid block of optical plastic, for example, acrylic, formed by an injection molding process, or may be a glass plate. In either case, the optical plate 64 is fabricated so as to provide surfaces and lenses for transferring image data from the platen 130 to the external image sensing device 168. The optical plate 64 comprises the platen 130, and the aspheric illuminating and imaging lenses 128,142, respectively, for imaging a fingerprint from the platen 130 onto the external image sensing device 168 as light rays by refraction from the imaging lens 142. Integral with the optical plate 64 are reflecting surfaces between the platen 130 and the aspheric imaging lens, some of which are toroidal. The toroidal surfaces work in combination with the aspheric imaging lens 142 to reduce or eliminate any geometric distortion or astigmatism in the image that is transferred to the image sensing device 168. As previously noted, the geometric distortion results from the optical TIR angular perspective view of the platen at the image sensing device 168.

In FIG. 5, the top surface 86 of the optical plate 64 is shown. The top surface 86 has ground and polished surfaces that comprise the platen 130 and first and second toroidal surfaces 136, 140. The toroidal surfaces 136, 140 have optical power that is dominant in the axis of propagation to reduce or eliminate geometric distortion and astigmatism at the plane of the imaging device. However, this creates astigmatism within the optical plate 64, especially at the nominal stop plane of the off-axis aspheric imaging lens 142, which then has differential stop planes in the x- and y-axes. The second toroidal surface 140 provides a narrow aperture in an axis transverse to the propagation of light, which is arbitrarily labeled the x-axis in this embodiment, and a wide aperture in an axis aligned with the propagation of light, which is arbitrarily labeled the y-axis. As illustrated, the second toroidal surface 140 is formed as a rectangular surface, with the long axis oriented in the y-direction, and a relatively narrow surface in the x-direction. Thus formed, the second toroidal surface 140 provides an aperture stop in the x-direction only and at an optimal astigmatic distance from the imaging lens 142, thereby stopping down or narrowing the cone of light rays that are incident on the imaging lens 142 in this axial direction. The narrowed cone reduces the circle of confusion or blur in an image at the image sensing device 168 in this axial direction. As best seen in FIG. 10, the second toroidal surface 140 is positioned relative to the top surface 86 within an angular recess 100 at the frustrum of a frustrotrapezoidal section 102 to receive light reflected from a second planar surface 138, described below. The frustrum preferably has an aluminum or silver coating 103 to enhance the reflectivity of this surface. In accordance with the invention, the x-direction aperture stop for the aspheric imaging lens 142 is located on one side of the nominal focal point of the illuminating lens 128 whereas the y-direction aperture stop for the imaging lens 142 is displaced in space to the other side of this nominal focal point.

FIG. 6 shows the bottom surface 88 of the optical plate 64 through which radiation is provided and image data is extracted. The bottom surface 88 includes a wall 104 that extends normally therefrom along one margin of the optical plate. The wall 104 has the slot 92 therethrough for housing the source 90 at an angle sufficient to totally internally reflect radiant energy from the source off of the platen 130. Between the wall 104 and the illuminating lens 128 is a cavity 106 that permits radiation from the source 90 to shine on the illuminating lens 128. The walls of the cavity 106 may define slots 108 for supporting the optional diffusing or apodizing surface 98. On the other side of the illuminating lens 128 there is a filler 110 which prevents truncation of radiation from the source 90 between a bottommost portion of the illuminating lens 128 and the ostensible bottom plane of the optical plate 64. The filler has an unpolished tool surface 112 (FIG. 7) and is simply an extension of the optical material of the optical plate 64.

With further reference to FIG. 6, first and second planar surfaces 134, 138 are provided, in part, to steer evanescent wave image rays reflected from the platen 130 toward the aspheric imaging lens 142. The first planar surface 134 is positioned on the bottom surface 88 so that reflected image rays from the leading and trailing edges 94, 96 of the platen 130 are incident thereupon. As illustrated, the second planar surface 138 is formed as the frustrum of a frustroconical section 114, although the invention is not so limited. The frustroconical section 114 positions the frustrum or second planar surface 138 so that the TIR evanescent wave image rays, reflected from the first toroidal surface 136, are incident thereupon. However, the second planar surface 138 need only be formed to provide a wide aperture in the x-axis, and a narrow aperture in the y-axis to provide an aperture stop in a direction orthoganol to the aperture stop provided by the second toroidal surface 140, namely, in the y-direction only at an optimal astigmatic distance from the imaging lens 142, stopping down or narrowing the cone of light rays that are incident on the imaging lens 142 in this axial direction. The second planar surface could readily be formed as a rectangular surface, with the long axis oriented in the y-direction. Thus, in combination, the second planar surface 138, the second toroidal surface 140, and the aspheric imaging lens 142, provide a split-axis aperture stop, stopping down or narrowing the cone of light rays incident on the imaging lens 142 in the x- and y-directions, at different points in space, thereby accommodating the astigmatism of the stop plane.

Because the off-axis TIR design with geometric distortion-correcting toroids introduces an astigmatism in the optical system, the x- and y-focal points do not coincide in one plane within the optical plate 64. Thus, the stop of the system is disjointed or split, and resolution, in terms of depth of focus, is enhanced by the aforementioned second planar surface 138 which is adapted to stop down the y-directed rays of light from the platen 130 at the y-focal point, and by the aforementioned second toroidal surface 140 which is adapted to stop down the x-directed rays of light from the platen 130 at the x-focal point, which is further along the direction of propagation of the light, that is, the y-direction. Image blur is therefore reduced or eliminated by accommodating stop-plane astigmatism which is otherwise introduced by the toroids 136, 140 and the off-axis aspheric lens 142, while providing a wide field of view of the platen 130. Hence, one of the toroidal elements and one of the planar elements are used in combination to form the system aperture to control the f/number, the overall resolution, and stray light.

While the second planar surface 138 has been described as being adapted to stop down the y-directed rays and the second toroidal surface 140 as being adapted to stop down the x-directed rays, this is arbitrary. The converse situation may be true based on the particular aspheric illuminating lens 128 chosen and the axial orientation thereof with respect to the optical plate 64.

The light path for image transfer through the optical plate 64 commences with source 90 through illuminating lens 128 to the platen 130 where a digit 32 may be placed, and from the platen 130 to the first planar surface 134, then to the first toroidal surface 136 and then to the second planar surface 138, all by TIR. From the second planar surface 138, the evanescent wave image rays strike the second toroidal surface 140 which is backed by an aluminum coating because it is only about sixty percent TIR, and reflects therefrom to the imaging lens 142. From the imaging lens 142, the evanescent wave image rays are transferred to the external image sensing device 168. In shorthand, the optical path into and out of the optical plate 64 is: 90-128-130-134-136-138-140-142-168.

The optical plate 64 is mounted in spaced relation to the PCB 66 having the image sensing device 168 by the posts 76 and threaded apertures 77. A flange 116 on one of the posts 76 may locate the imaging lens 142 relative to the image sensing device 168 when the optical plate 64 and PCB 66 are assembled. For example, the flange 116 may be received in a slot 69 in the image sensing device 168, which slot is typically provided so that the pins of the integrated device, for example, a charge coupled device chip, may be oriented with respect to the PCB 66. The flange would therefore assist in locating the optical plate 64 over the PCB 66. As seen in FIG. 7, the integrated optical system 62 is held together by screws 77A.

With further reference to FIG. 7, the curvature, alignment, and relative positioning of the surfaces 128, 130, 134, 136, 138, 140, and 142 can be better appreciated, although FIG. 7 is not intended to be a scale drawing. It is seen that the source 90 in the slot 92 irradiates the aspheric illuminating lens 128 at a preselected angle so that the light from the source 90 is distributed across the platen 130 by the illuminating lens 128 at the critical angle or greater. In FIG. 8, the filler 110 and unpolished surface 112 are shown. By extending the unpolished surface 112 to a bottom, abutting margin of the illuminating lens 128, the light from the source 90 is not truncated, but rather floods the extent of the platen 130, from its leading to trailing edges 94,96.

As illustrated in FIG. 7, the geometry of the first toroidal surface 136 is shown as having a curve of one radius in the y-axis, and, in FIG. 9, a curve of another radius in the x-axis. The geometry of the second toroidal surface 140 is shown in the orthoganol views of FIGS. 7 and 10. The second toroidal surface 140 has its long axis oriented in the y-direction (FIG. 7), and has its relatively narrow surface in the x-direction (FIG. 10). FIG. 7 also shows the relative alignment of the aspheric imaging lens 142 and the image sensing device 168. The evanescent wave image rays including digit data or fingerprint information are transferred by the aspheric imaging lens 142 uniformly across the top surface of the image sensing device 168. Further, the aspheric imaging lens 142 is positioned so that its aperture stop is located at the nominal focal point of the illuminating lens 128. In this way, a high percentage of the radiation can be delivered the external image sensing device 168.

In the preferred embodiment, the optically active region, that is the portion of the optical plate 64 through which the evanescent wave image rays travel, is approximately 0.75" W×0.31" H×2.00" L. Including the radiation source mounting (the wall 122 and the slot 104) and the external image sensing device 168 mounted on the PCB 66, the overall dimensions increase to approximately 0.75" W×0.75" H×2.50" L.

Figure 11:
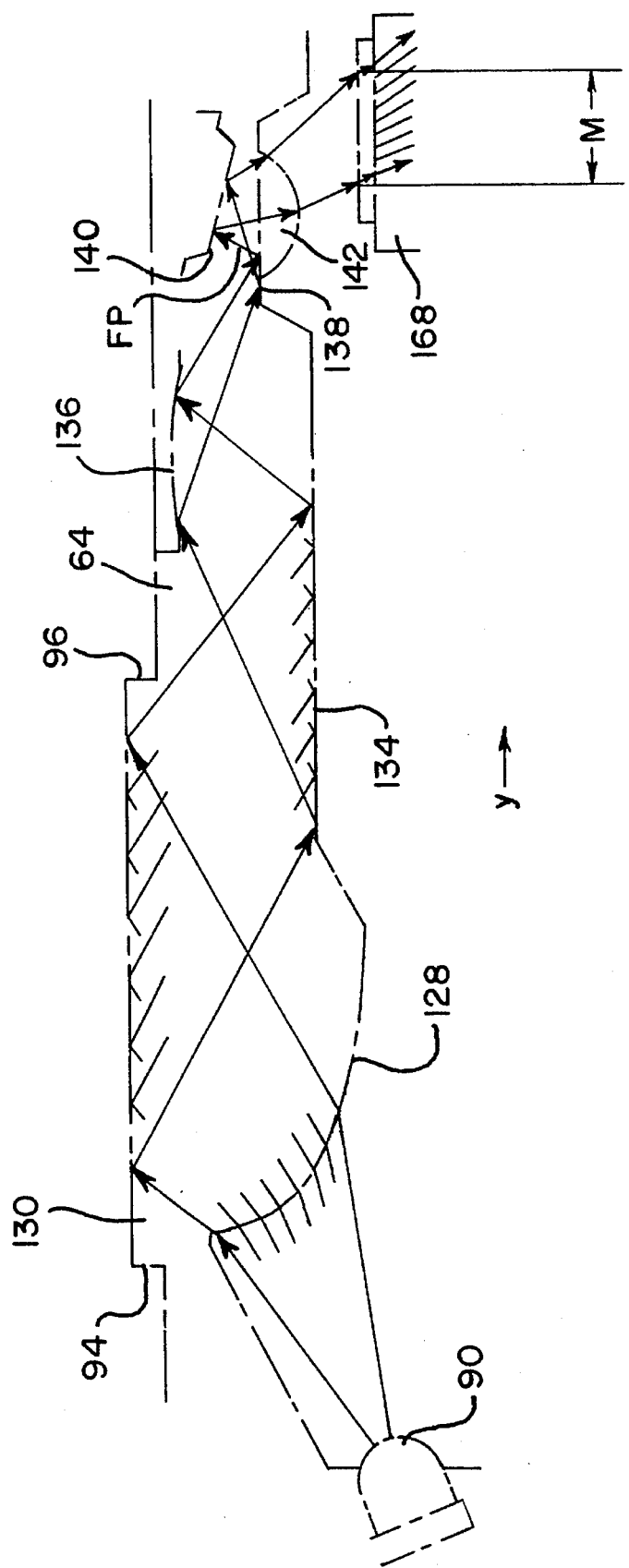
FIG. 11 is a side view of a propagation of light waves through the apparatus of FIG. 5 onto an image sensing device.

In FIG. 11, the propagation or transfer of the evanescent wave image is detailed in the y-direction, that is, in the direction of the propagation of light, with the optical plate 64 shown in phantom. The source 90 emits radiation in a generally diverging pattern which is converted to a mildly convergent beam by the aspherical illuminating lens 128. The illuminating lens 128 spreads the radiant energy from the source across the platen 130 from its leading edge 94 to its trailing edge 96 so that evanescent wave image data presented to the platen 130 can be transferred to the image sensing device 168. By TIR, the image data is reflected from the platen 130 to the surfaces 134, 136, 138, 140 and through the imaging lens 142. The image wave converges as it travels toward the second planar surface 138, and before reaching the second toroidal surface 140, the image wave converges at the nominal focal point FP of the illuminating lens 128. Thereafter, the leading and trailing edges of the image wave are inverted, and so the data from the leading edge 94 of the platen strikes the second toroidal surface 140 at that surface's trailing edge, and vice versa. The reversed image then exits the optical plate 64 through the imaging lens 142 and is transferred to the external image sensing device 168.

Figure 12:
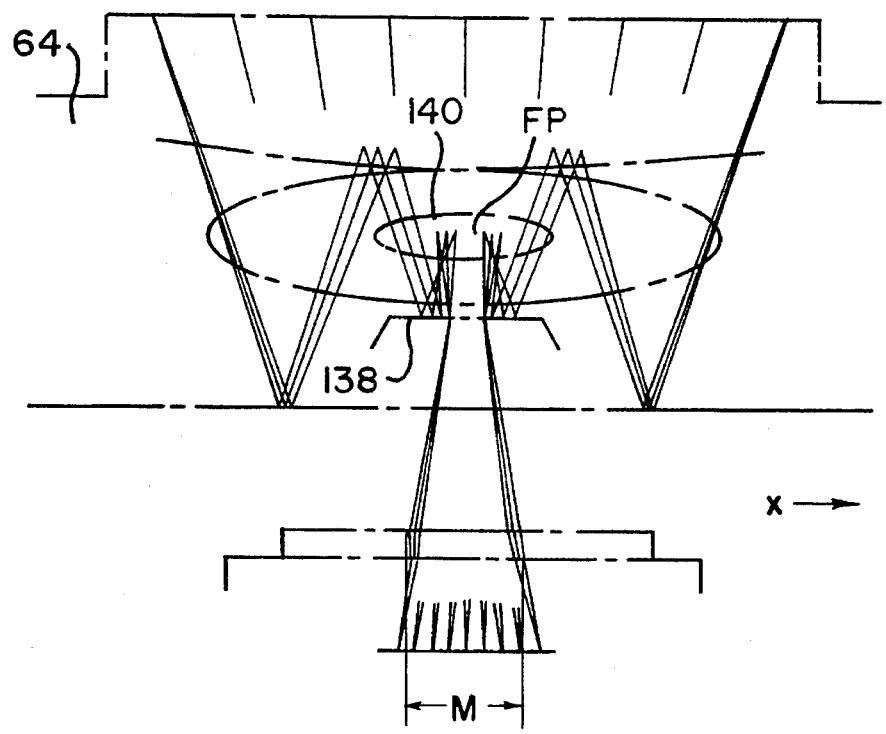
FIG. 12 is a front view of the propagation of light waves as shown in FIG. 11.

In FIG. 12, the same propagation of the evanescent wave image is illustrated, this time from a front view, that is, showing the x-direction which is transverse to the direction of the propagation of light in the optical plate 64. As can be seen from this figure, the evanescent wave image converges at FP between the second planar surface 138 and the second toroidal surface 140. From the views of FIGS. 12 and 13, the cone-like convergence of the radiation from the source 90 can be appreciated. Further, the overall magnification or fan in these directions is preferably configured to be the same. For example, a construction can be achieved having nearly matching magnifications, M, in the x- and y-axes (FIGS. 11 and 12).

Figure 13:
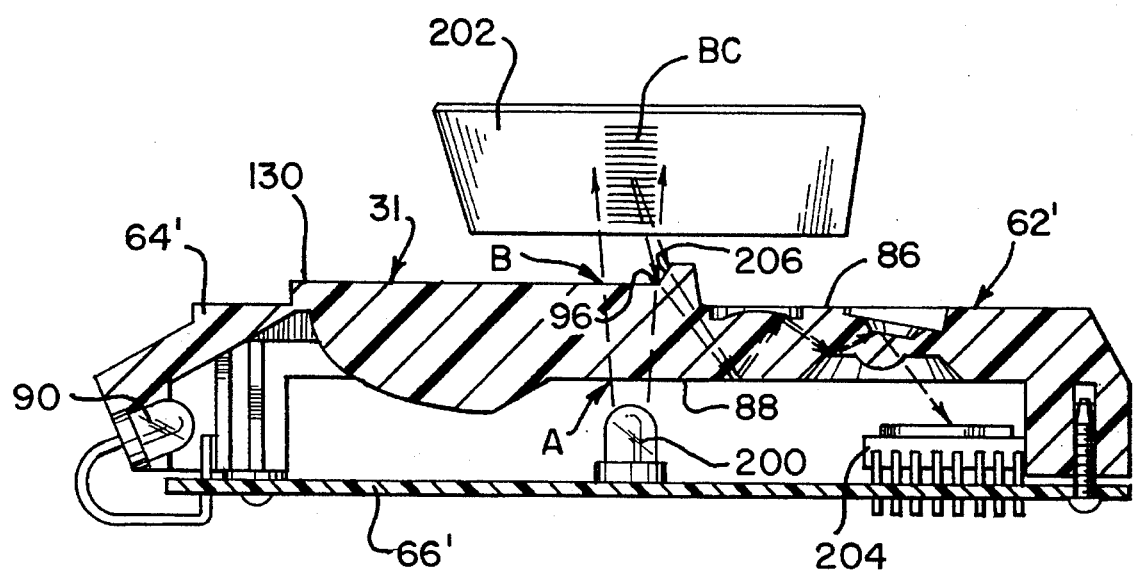
FIG. 13 is an uneven surface image transfer apparatus in accordance with a second embodiment of the present invention.

In FIG. 13, a second embodiment of the uneven surface detection apparatus is shown in which features common to the first embodiment are given corresponding reference numerals. Otherwise than as specifically described below, this alternative embodiment shares the inventive lens arrangement adapted to reduce or eliminate geometric perspective distortion and astigmatism within the optical plate 64, and operates using the source 90 as described above. However, for certain database and security applications, it may be desirable to scan information to supplement fingerprint data, or simply other information altogether such as bar code or other data. Hence, the optical system 62' of FIG. 13 includes in addition to the features of the optical plate 64, a source 200 mounted on the PCB 66' so as to irradiate the optical plate 64' nearly or substantially normal to the bottom surface 88. In this orientation, the light radiated by the source 200 enters the optical plate 64' at A, beneath the presentation surface 31, and passes therethrough to an opposite margin B, at which point it is refracted outward at an angle somewhat skewed from a line normal to the top surface 86 of the optical plate 64'. The light irradiated from the source 200 may then impinge upon an object 202 located generally above point B, but not necessarily in contact with or parallel to the presentation surface 31. The object 202 may contain a bar code BC or other uneven surface for transferring to an image sensing device 204 (or image sensing device 168). The image sensing device 204 may be a linear CCD chip, as commonly used for bar code scanning in point-of-sale and industrial applications. Alternatively, the image sensing device 168 of the first embodiment, which is preferably a CCD chip including an image area sensor (IAR), can be used as a limited-field or linear CCD by prematurely terminating the area scan pattern with a scan reset pulse so that only a few lines in the CCD array are utilized. In this manner, only that portion of the CCD scan area which receives the transferred image from the object 202 is utilized. In this regard, the complement of other electronic components 70A,B, . . . N mounted on the PCB 66' (not shown in this cross section, but see FIG. 4) may include circuitry to reset the scan cycle of the image sensing device 168 under control of such circuitry as understood by persons skilled in the art, and may further include circuitry to switch the mode of operation between that described for the first and second embodiments.

In this embodiment, the optical plate 64' includes a linear prismatic element 206 in the vicinity of the trailing edge 96 of the platen 130. A portion of the light reflected from the object 202 enters the optical plate 64' through the refractive prismatic element 206. The light is then reflectively transferred in a manner as previously described to the image sensing device. The linear prismatic element 206 may be integrally formed on the optical plate 64', and, in any event, is mounted or formed at an angle chosen to frustrate TIR, in other words, at an angle that is refractively transmissive.

Scanning of two-dimensional bar codes can be facilitated by providing a slot (not shown) for controlled motion of objects 202 such as credit cards. This slot may be integral to the presentation surface 31, and in particular, can be formed as part of a finger-stop or tactile feedback means which may also serve as an indicator to the operator of the location of his or her digit 32 on the platen 130.

A fingerprint can be captured at a location remote to the optical plate 64' for later transfer to the image sensing device by use of a thermally activated sheet of paper. The thermally activated paper responds, for example, to an individual's body temperature by recording a fingerprint image thereon. The image can then be converted to a digital format by reflecting the fingerprint image data from the thermal paper (which serves as the object 202 in this exemplary application) using the uneven surface detection apparatus of FIG. 13.

As a modification of either of the foregoing embodiments, or both, the resolution performance can be enhanced by including a device for shuttering the external image sensing device 168,204 between open and closed positions. Either the evanescent wave image from the presentation surface 130 or the bar code data BC from the prismatic element 206 is captured when the external image sensing device is shuttered to an open position. As a result, the object whose image is being transferred (either the digit 32 or the object 202) is captured over an abbreviated time period which reduces the exposure time of the image sensing device and thereby limits the effects of any motion of the object which might otherwise blur the transferred image. Alternatively or additionally, the optical system 62' may include a strobing device for intermittently illuminating the platen, and perhaps an actuator for actuating the image sensing device and causing same to capture either evanescent wave or bar code BC image data from the platen 130 or the prismatic element 206. By pulsing the source intermittently, the source may be operated at a higher level of emission to deliver a nominally equivalent amount of energy in a shorter period of time without overheating or being damaged. Preferably, the actuator causes the external image sensing device to capture images in synchronization with the intermittent illuminations of the platen or prismatic surface. Either the shuttering or the strobing or both can be accomplished by conventional mechanical or electronic devices.

The surface figure and irregularity of the lenses should be within 20 fringes. In regard to the lens cosmetics, the scratch should be no greater than 60 microns wide and the dig no greater than 40 microns wide, per surface. The axis of each lens or molding tool insert should be ground, polished, or both to within 0°1'30". Finally, the lens centration should be ±0.002" on the toroidal surfaces and ±0.005" on the other lens surfaces.

The image sensing device 168 may be a conventional CMOS CCD device. It is preferred that the image area sensor (IAR) be able to resolve 500 dots per inch (DPI). A conventional CCD chip has 510×494 pixels, each of which is digitized to an 8 bit value. 500 DPI is the baseline resolution used by several fingerprint feature detection systems, including the Federal Bureau of Investigation's fingerprint identification system and in a system disclosed in U.S. application Ser. No. 08/036,845 to Shen, filed Mar. 25, 1993, for METHOD AND SYSTEM FOR DETECTING FEATURES OF FINGERPRINT IN GRAY LEVEL IMAGE, assigned to Cogent Systems, Inc. The digitized signal may be filtered to (a) remove background noise, and (b) perform edge enhancement. The edge enhancement process sharpens the image and fills in any erroneous gaps in the ridge of a fingerprint. This signal is then ported to a fingerprint feature detection system such as either of the aforementioned systems. This signal is from 16K to 40K, depending on the particular application. For example, if the fingerprint information is transmitted by hard wire, then a 40K signal can readily be transmitted. However, for efficiency, the digital processor may further include digital compression to reduce the information down to 16K so that it may be transmitted by a wireless link, as understood by persons skilled in the art. Any acquired fingerprint image data is stored in less than about 1K of memory, for example, in a bar code such as by Symbol, in semiconductor memory (RAM, DRAM, SRAM, EPROM, PROM, ROM), or on optical or magnetic media (CD ROM, Laserdisk, Minidisk, hard disk, or floppy disk), as understood by those skilled in the art.

In the preferred embodiment, the source 90 emits a small range of wavelengths centered around 565 nm (which appear green to the naked eye), preferably in the range of 550 to 600 nm. While other wavelengths could be used as well, these preferred wavelengths are selected because they provide a sharp image at the image sensing device 168 and optimal contrast for flesh-tone fingerprints. Conventionally, when the image sensing device is chosen to be a CCD chip, the center wavelength output by the source has been chosen to be at the peak sensitivity of CCD's so that the image sensing device is made sensitive. This center wavelength is outside of the range of wavelengths centered about 565 nm. However, because the optical plate 64 efficiently reflects light to the image sensing device, some sensitivity can be sacrificed in the present design in favor of image quality, at the discretion of the optical design engineer charged with striking a balance between these conflicting design criteria. The reflective surfaces intermediate the platen 130 and the image sensing device 168 are selected to optimize the optical design by minimizing geometric distortion at the selected source output wavelength.

While the foregoing preferred embodiment has been described with regard to certain reflective surfaces, other reflective surfaces may be included to create a required magnifying optical path length in minimal space. These surfaces may also be TIR and therefore not require any special reflective coatings, or may be coated to ensure TIR.

As used in this Specification, uneven surface refers to a surface that is uneven in the physical sense of an irregular surface contour, or uneven in the optical sense of contrasting surfaces, and in particular, juxtaposed black and white images such as the bar code BC.

The term "fingerprint" as used in this specification refers to the ridge and groove patterns found on the digits of either hand, including the pinky, ring, middle, and index fingers as well as the thumb. The term "image processing system" as used herein refers to the compression, analysis, and matching routines that may be used in conjunction with the integrated optical system 62 of the present invention. Further, the term "platen" as used herein embraces the prismatic element 206, notwithstanding any previous discussions in which the terms are used in the alternative.

From the foregoing description, it will be clear that the present invention may be embodied in other specific forms without departing from the spirit or essential characteristics thereof. Thus, for example, while two embodiments of the uneven surface image transfer apparatus have been shown and described, the invention is not limited to these embodiments. Other configurations are deemed to be within the scope of the invention provided they are adapted to maintain geometric fidelity as described above. The presently disclosed embodiments are therefore to be considered in all respects as illustrative and not restrictive, the scope of the invention being indicated by the appended claims, and not limited to the foregoing description.

I claim:

1. An optical plate for transferring an image from a platen thereon to an external image sensing device, the platen comprising a totally internally reflecting object contact surface for creating evanescent wave image rays, the optical plate comprising:

an aspheric illuminating lens for illuminating the platen with light from a radiation source, the aspheric illuminating lens having a nominal focus point;

a first reflecting surface positioned on one side of the nominal focus point;

a second reflecting surface positioned on another side of the nominal focus point; and an imaging lens having a nominal aperture stop, the imaging lens being positioned so that the nominal aperture stop is located at the nominal focus point of the illuminating lens, the imaging lens receiving the evanescent wave image rays from the platen as reflected from the first and second reflecting surfaces and transferring same to a location external to the optical plate.

2. The optical plate as in claim 1, wherein the first reflecting surface includes stop down means for stopping down light in a first direction and the second reflecting surface includes stop down means for stopping down light in a second direction, whereby an object placed on the platen is sharply focussed at a location external to the optical plate.

3. The optical plate as in claim 2, wherein the first and second directions are orthoganol.

4. The optical plate as in claim 3, wherein the first and second reflecting surfaces are in different planes.

5. The optical plate as in claim 1, wherein the first reflecting surface has a planar surface configuration.

6. The optical plate as in claim 1, wherein the second reflecting surface has a toroidal surface configuration.

7. The optical plate as in claim 1, wherein at least one of said first and second surfaces includes a reflective coating.

8. The optical plate as in claim 1, further comprising additional reflective surfaces for increasing the optical path length sufficient to provide a preselected image magnification.

9. The optical plate as in claim 1, wherein each of the aspheric illuminating lens, the first reflecting surface, the second reflecting surface, and the imaging lens are integral to the optical plate.

10. The optical plate as in claim 1, wherein the aspheric imaging lens is positioned off-axis.

11. The optical plate as in claim 10, further comprising a third surface, the third surface being positioned on the one side of the nominal focus point, the second and third surfaces being toroidal in shape and having an optical power that is dominant a direction of propagation of the evanescent wave image rays so that the second and third surfaces operate in conjunction with the off-axis aspheric imaging lens to reduce geometric distortion and astigmatism at a location external to the optical plate.

12. In combination with the optical plate of claim 1, the platen of the optical plate having an image transfer surface, the combination further comprising;

a radiation source disposed substantially normal to the platen and below the image transfer surface; and a linear prismatic element adapted to reflectively transfer image rays from an object in the vicinity of the image transfer surface to the first and second reflecting surfaces and the imaging lens free of the aspheric illuminating lens.

13. The combination of claim 12, wherein the linear prismatic element is mounted to the optical plate at a refractive transmission angle.

14. The combination of claim 12, further comprising an external image sensing device.

15. The combination of claim 14, wherein the external image sensing device is a linear CCD.

16. The combination of claim 14, wherein the external image sensing device is an image array sensor CCD, the combination further comprising reset means for resetting the image sensing device prior to its scanning the entire image sensor array so that it only scans an area sufficient to receive image rays transferred from the linear prismatic elements.

17. An optical plate illuminated by light from a radiation source, comprising:

a platen having a totally internally reflecting object contact surface for creating evanescent wave image rays;

an aspheric illuminating lens for illuminating the platen with light from the radiation source, the aspheric illuminating lens having a nominal focus point;

a first planar surface for reflecting the evanescent wave image rays from the platen;

a first toroidal surface for reflecting the evanescent wave image rays from the first planar surface;

a second planar surface positioned on one side of the nominal focus point for reflecting the evanescent wave image rays from the first toroidal surface;

a second toroidal surface positioned on another side of the nominal focus point for reflecting the evanescent wave image rays from the second planar surface; and an imaging lens having a nominal aperture stop, the imaging lens being positioned so that the nominal aperture stop is located at the nominal focus point of the illuminating lens, the imaging lens receiving the evanescent wave image rays reflected from the second toroidal surface and transferring same to a location external to the optical plate.

18. The optical plate as in claim 17, wherein the evanescent wave image rays include contact point information regarding the points of contact of an object and the platen.

19. The optical plate as in claim 18, wherein the contact point information is one of a severely, attenuated evanescent wave image ray and an absence of an evanescent wave image ray.

20. The optical plate as in claim 17, wherein the aspheric imaging lens is positioned off-axis.

21. The optical plate as in claim 20, wherein the first and second toroidal surfaces have an optical power that is dominant a direction of propagation of the evanescent wave image rays so that the first and second toroidal surfaces operate in conjunction with the off-axis aspheric imaging lens to reduce geometric distortion and astigmatism at a location external to the optical plate.

22. In combination with a radiation source and an external imaging device, an optical plate for transferring an image from a platen thereon to an external image sensing device, the platen comprising a totally internally reflecting object contact surface for creating evanescent wave image rays, the platen being illuminated by light from the radiation source, the optical plate comprising:

an aspheric illuminating lens for illuminating the platen with light from the radiation source, the aspheric illuminating lens having a nominal focus point for converging the light from the radiation source;

a first reflecting surface positioned on one side of the nominal focus point;

a second reflecting surface positioned on another side of the nominal focus point; and an imaging lens having a nominal aperture stop, the imaging lens being positioned so that the nominal aperture stop is located at the nominal focus point of the illuminating lens, the imaging lens receiving the evanescent wave image rays from the platen as reflected from the first and second reflecting surfaces and transferring same to the external image sensing device.

23. The optical plate as in claim 22, wherein the radiation source is aligned along the optical axis of the aspheric illuminating lens.

24. The combination as in claim 22, further comprising strobe means for intermittently illuminating the platen.

25. The combination as in claim 24, further comprising actuating means for actuating the external image sensing device and causing same to capture the evanescent wave image rays from the platen.

26. The combination as in claim 25, wherein the actuating means actuates the external image sensing device in synchronization with the intermittent illuminations of the platen.

27. The combination as in claim 22, further comprising shutter means for selectively shuttering the external image sensing device between open and closed positions.

28. The combination as in claim 27, further comprising actuating means for actuating the external image sensing device and causing same to capture the evanescent image rays from the platen.

29. The combination as in claim 28, wherein the actuating means actuates the external image sensing device in synchronization with the selective shutterings of the shutter means.

30. The optical plate as in claim 22, wherein the aspheric imaging lens is positioned off-axis.

31. The optical plate as in claim 30, further comprising a third surface, the third surface being positioned on the one side of the nominal focus point, the second and third surfaces being toroidal in shape and having an optical power that is dominant a direction of propagation of the evanescent wave image rays so that the second and third surfaces operate in conjunction with the off-axis aspheric imaging lens to reduce geometric distortion and astigmatism at the image sensing device.

* * * * *